United States Patent
Rød

(10) Patent No.: US 10,569,236 B2
(45) Date of Patent: Feb. 25, 2020

(54) DIFFUSOR

(71) Applicant: Storvik Aqua AS, Sunndalsøra (NO)

(72) Inventor: Peder Anders Rød, Meisingset (NO)

(73) Assignee: Storvik Aqua AS, Sunndalsøra (NO)

(*) Notice: Subject to any disclaimer, the term of this patent is extended or adjusted under 35 U.S.C. 154(b) by 313 days.

(21) Appl. No.: 15/517,043

(22) PCT Filed: Oct. 20, 2015

(86) PCT No.: PCT/NO2015/050194
§ 371 (c)(1),
(2) Date: Apr. 5, 2017

(87) PCT Pub. No.: WO2016/064278
PCT Pub. Date: Apr. 28, 2016

(65) Prior Publication Data
US 2017/0246596 A1 Aug. 31, 2017

(30) Foreign Application Priority Data
Oct. 20, 2014 (NO) .................................. 20141250

(51) Int. Cl.
*B01F 3/04* (2006.01)
*A01K 63/04* (2006.01)
(Continued)

(52) U.S. Cl.
CPC .......... *B01F 3/04262* (2013.01); *A01K 61/13* (2017.01); *A01K 61/60* (2017.01);
(Continued)

(58) Field of Classification Search
CPC ........ C02F 1/727; B01F 3/04; B01F 3/04099; B01F 3/04241; B01F 3/04262; B01F 2003/04319
(Continued)

(56) References Cited

U.S. PATENT DOCUMENTS 3,803,849 A * 4/1974 Bryant ................ B01F 3/04262
405/22

FOREIGN PATENT DOCUMENTS

EP       1493717 A1    1/2005
JP    2007260529 A   10/2007
(Continued)

OTHER PUBLICATIONS

English Machine Translation of WO 2003059537.*
Eilrich, Elena; "International Search Report" prepared for PCT/NO2015/050194 dated Jan. 7, 2016; 4 pages.

*Primary Examiner* — Robert A Hopkins
(74) *Attorney, Agent, or Firm* — Winstead PC

(57) ABSTRACT

The invention relates to a diffusor for adding of gases into water, said diffusor comprising a perforated tube (1) and at least one supply tube (2), said the at least one supply tube (2) is at one end coupled to a source for supplying gas and at the other end in fluid communication with the perforated tube (1), the gas is supplied to the perforated tube (1) through at least one inner supply tube (4; 5; 15) extending from the supply tube (2) to the perforated tube (1). The invention is distinctive in that at the least one inner supply tube (4; 5; 15) is a non-perforating tube and has at least one outlet (4a, 5a, 15a) situated at a free end of the at least one inner supply tube (4, 5, 15), said gas is adapted to be distributed into the perforated tube (1) through the at least one outlet (4a, 5a, 15a).

14 Claims, 12 Drawing Sheets

(51) Int. Cl.
  *A01K 61/13*   (2017.01)
  *A01K 61/60*   (2017.01)
  *B01F 15/00*   (2006.01)
  *B08B 9/032*   (2006.01)
  *C02F 1/72*    (2006.01)
  *A01K 61/10*   (2017.01)
  *C02F 103/20*  (2006.01)

(52) U.S. Cl.
  CPC ........ *A01K 63/042* (2013.01); *B01F 3/04241* (2013.01); *B01F 3/04269* (2013.01); *B01F 15/00025* (2013.01); *B01F 15/00071* (2013.01); *B08B 9/0328* (2013.01); *C02F 1/727* (2013.01); *A01K 61/10* (2017.01); *B01F 2003/04148* (2013.01); *B01F 2003/04319* (2013.01); *B01F 2003/04361* (2013.01); *B01F 2003/04879* (2013.01); *C02F 2103/20* (2013.01); *Y02A 40/814* (2018.01); *Y02A 40/826* (2018.01)

(58) Field of Classification Search
  USPC ...................................... 261/121.1
  See application file for complete search history.

(56) References Cited

FOREIGN PATENT DOCUMENTS

| | | | |
|---|---|---|---|
| SU | 1782943 A1 * | 12/1992 | ............... C02F 3/20 |
| WO | WO-03024578 A1 | 3/2003 | |
| WO | WO-03059537 A1 | 7/2003 | |

\* cited by examiner

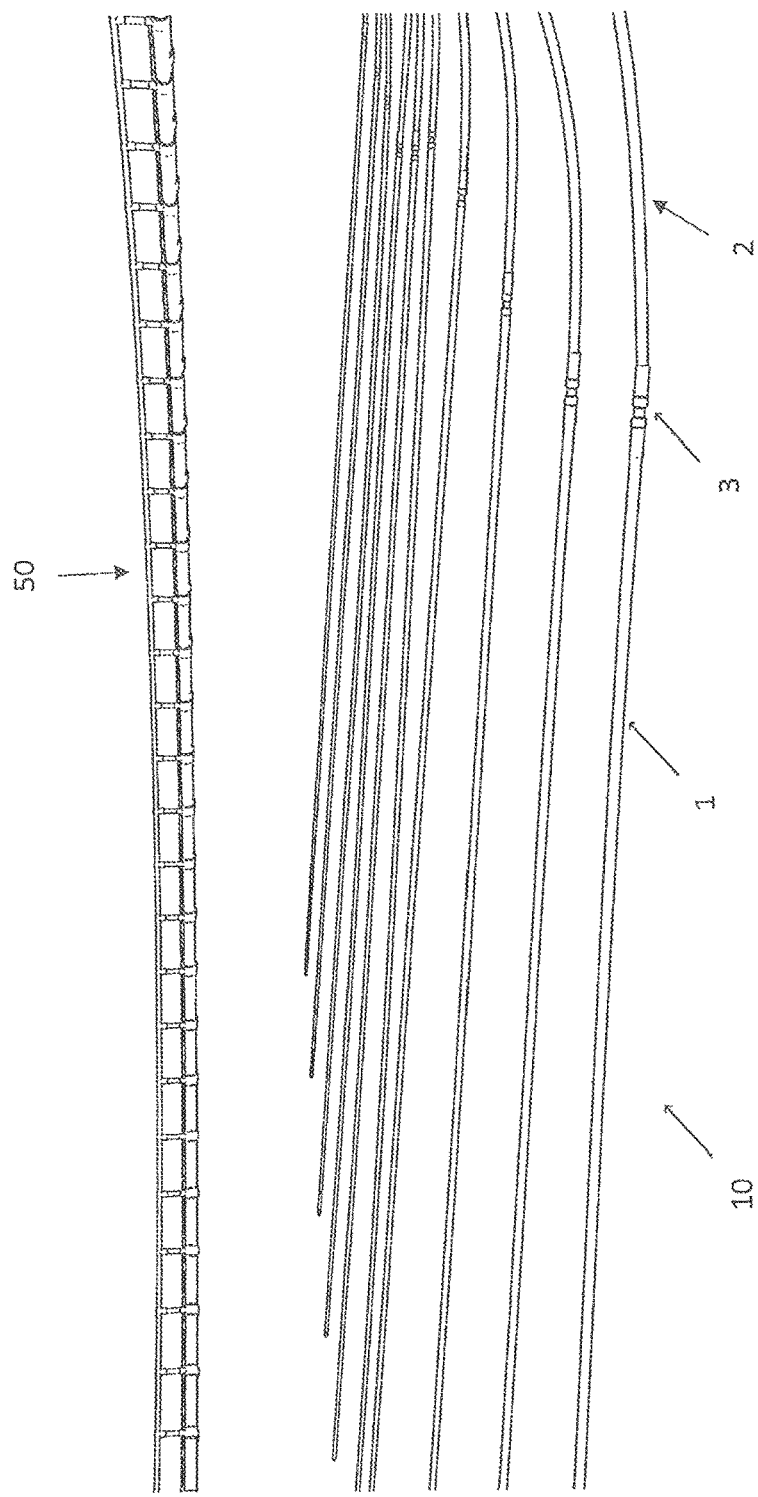

DIFFUSOR

FIELD OF THE INVENTION

The invention relates to a device for adding of gases into water, in particularly the invention relates to a diffusor with a perforated tube with inner supply tubes for supplying of gases. The invention also relates to a method for quick evacuating of water from the device and/or system for disinfection of the device.

BACKGROUND OF THE INVENTION

A diffusor for supplying of gases could have several range of use. For instance farming of aqua cultural organisms for instance fish. A diffusor for supplying gases could also be used in sewage treatment, supplying of oxygen in lakes but also other water treatment arrangement.

Aquaculture farming of food is a growing industry that is striving to satisfy a growing market for protein based food, such as fish. There are different methods for growing the protein based food, like outdoors in open ponds or net cage in seawater or fresh water, or indoor tanks.

The growth of the fish or protein based food must satisfy the conditions necessary to remain health and growth. For instance, the farmed organisms needs a continuous supply of clean water at correct temperature, sufficient oxygen and food.

Successful production depends on good oxygen management. The addition of oxygen in a pure form or as air is essential to sufficient growth, good feed conversion ratio and the survival at a low oxygen level will reduce growth, increase the susceptibility of the farmed organisms to diseases and parasites, and decrease production and profitability.

The addition of oxygen or air could also be used in the delousing of the fish.

Adding of oxygen or other gases is especially important in tanks where the density of the farmed organisms is high.

Other examples where supplying of gases to water are applied are sewage treatment of wastewater or supplying of oxygen in lakes or ponds. Wastewater treatment can be based upon chemical or biological treatment and both technologies are relevant for adding gases to achieve the desired results.

Publication WO03024578 discloses a device for use in aquaculture installations, which enables oxygen to be added in the form of micro-bubbles in large amounts, to seawater in open cage installations. The device comprising a perforated tube for oxygen supply and at least one perforated tube for oxygen distribution, the perforated tube for oxygen supply is arranged at the inside of the perforated tube for oxygen distribution.

A disadvantage of the known solution is that the arrangement is complex in that both tubes must be perforated to distribute the oxygen and that the space between the two perforated tubes are divided into chambers.

The perforated tube for oxygen supply could also clog over time and are difficult to clean. It is also necessary for the inner perforated tube to have lesser number of perforations than the outer perforated tube.

Contrary to beliefs, tests made by the applicant have shown that there is no need to supply the oxygen very evenly within the distribution tube.

The present invention is advantageous over the above prior art in that the tubes for oxygen supply arranged within the tube for oxygen distribution, is a tube without perforations and is therefore a simpler solution to distribute oxygen.

Other and further objects, features and advantages will appear from the following description of preferred embodiments of the invention, which are given for the purpose of description, and given in context with the appended drawings.

SUMMARY OF THE INVENTION

The invention also relates to another embodiment of the diffusor for adding gases into water, said diffusor comprising a perforated tube and at least one supply tube, said the at least one supply tube is in one end coupled to a source for supplying gas and in the other end in fluid communication with the perforated tube, the gas is supplied to the perforated tube through at least one inner supply tube extending from the supply tube to the perforated tube. The diffusor is distinctive in that the at the least one inner supply tube having at least one outlet situated at a free end of the at least one inner supply tube, said gas is adapted to be distributed into the perforated tube through the at least one outlets.

The diffusor according to the invention has at least one inner supply tube that have a continuous surface without perforations. The inner supply tubes could be manufactured in a simpler manner than with the use of perforated inner tubes.

It is another possible embodiment of the diffusor according the invention that the at least one outlet of the at least one inner supply tube is situated in a range from one quarter to three quarter of the length of the perforated tube. The gas is thus distributed in the diffusor a defined distance from the inlet or supply tube.

Another possible embodiment of the invention is that the diffusor having at least two outlets that are spaced apart.

One of the outlets are preferably arranged at the first end of the perforated tube.

In another embodiment of the diffusor according to the invention the at least one inner supply tube is enclosed respectively by at least one opening in a first plug, said first plug is arranged between the supply tube and the perforated tube, the first plug having an opening for the at least one inner supply tube. This plug controls the gas so that it only is supplied through the openings of the plug.

In another embodiment of the diffusor according the invention the first plug having an additional plug outlet for supplying gas directly at a first end of the perforated tube. The gas is supplied to the perforated tube in the first end to reduce the number of inner supply tubes in the perforated tubes and increases the number of openings for supplying of gas.

In yet another embodiment of the diffusor according the invention there are at least two inner supply tubes, extending from the first plug, each having different length inside the perforated tube.

The diffusor having a first inner supply tube and a second inner supply tube extending at different positions within the perforated tube.

In yet another embodiment of the diffusor according to the invention there is a second plug arranged between the second supply tube and the perforated tube at a second end of the perforated tube, said second plug having an opening for the at least one inner supply tube arranged at the second end of the perforated tube.

In another embodiment of the diffusor according to the invention, the second plug having at least one additional plug outlet for supplying gas directly at a second end of the perforated tube.

In another embodiment of the diffusor according to the invention there are at least two inner supply tubes, extending from the second plug, each having different length inside the perforated tube.

These abovementioned embodiments aim to increase the number of outlets of the gas to get a more even distribution of gas. Another objective of the invention according to these abovementioned embodiments could also be that the length of the perforated tube could be increased without decreasing the effect of the diffusor and the distribution of the gas. It will also be possible to increase the diameter of the perforated tube to adapt to the number and diameter of the inner supply tubes.

In these embodiments of the diffusor there is arranged at least one supply tube in the perforated tube with an outlet with a position substantially in the middle portion of the perforated tube to have an efficient distribution of the gas in the perforated tube.

In yet another embodiment of the diffusor according to the invention that there is arranged a pressure valve at the opposite end of the perforated tube.

The purpose of this pressure valve to evacuate, clean or disinfect the diffusor by increasing the pressure in the diffusor.

The invention also relates to a method for evacuating water from or clean or disinfect a diffusor, said diffusor comprising a perforated tube and at least one supply tube, said at least one supply tube is in fluid communication with the perforated tube through at least one inner supply tube extending from the supply tube into the perforated tube. The method is distinctive in that the method comprising the following steps:

arranging a pressure relief valve at a second end of the perforated tube, supplying a pressure gas or a disinfectant through the supply tube into at least one inner supply outlet situated on the free end of the at least one inner supply tube, displacing the water or contaminant out of the diffusor through said pressure relief valve, until a substantial portion of the water or contaminant is evacuated out of the diffusor.

The invention also relates to a diffusor for adding of gases into water, said diffusor comprising a perforated tube and at least one supply tube, said the at least one supply tube is in one end coupled to a source for supplying gas and in the other end in fluid communication with the perforated tube. The gas is supplied to the perforated tube through at least two outlets arranged within the perforated tube, said outlets are spaced apart from each other in such a way that the gas is distributed at the inside of the perforated tube. The invention is distinctive in that the at least one outlet is situated at a free end of at least one inner supply tube, said inner supply tube is extending from the supply tube and a distance into the perforated tube. The inner supply tube does not have perforations, the gas is supplied through an outlet at the free end of the inner supply tube and an additional outlet spaced apart in order to disperse the gas supplied to the diffusor.

The invention also relates to a method for evacuating water from or disinfect a diffusor, said diffusor comprising a perforated tube and at least one supply tube, said at least one supply tube is in fluid communication with the perforated tube through at least two outlets arranged within the perforated tube, said one of the at least two outlets is arranged substantially at a first end of the perforated tube. The method is distinctive in that it is comprising the following steps:

arranging a pressure relief valve at a second end of the perforated tube, supplying a gas or a disinfectant through the supply tube and into the first end of the perforated tube, said gas or disinfectant being supplied and distributed into the perforated tube through the outlet at the first end and through the inner supply outlet, the gas or disinfectant displacing the water or contaminant from the first end and out of the perforated tube through the pressure relief valve until a substantial portion of the water or contaminant is evacuated out of the diffusor.

By supplying high pressure gas or disinfectant into the diffusor both at the first end of the perforated tube and at the inner supply outlet all of the water/disinfectant is evacuated out of the diffusor.

It is an embodiment of the method according to the invention to provide a process for disinfect or clean the diffusor by the steps:

supplying the disinfectant fluid to the diffusor, supplying a high pressure gas in order to displacing the disinfectant fluid out of the diffusor through the valve. The disinfectant could be held in the diffusor for a period of time before the high pressure gas is supplied into the diffusor to displace the disinfectant.

BRIEF DESCRIPTION OF THE DRAWINGS

The attached drawings show by way of example, preferred embodiments of the diffusor according to the invention.

FIG. 12 is a detailed view of several diffusors arranged in the net cage.

DETAILED DESCRIPTION OF THE INVENTION

Figure 1:
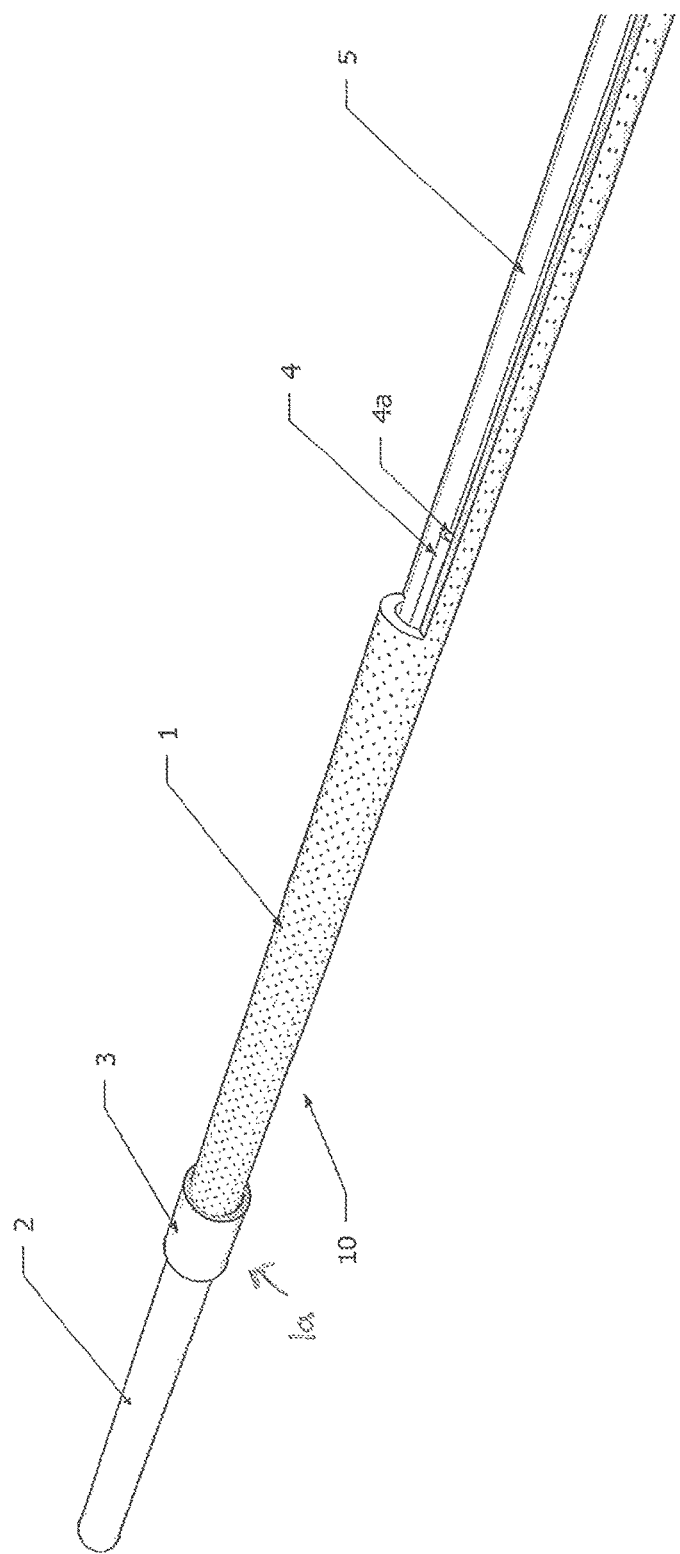
FIG. 1 shows a principle drawing of one embodiment of the diffusor with two inner tubes of different length.

In FIG. 1 it is shown a diffusor 10 according to a preferred embodiment of the invention. The diffusor 10 comprising a perforated tube 1. The perforated tube 1 is cylinder shaped with multiple openings on the periphery of the tube 1. The perforated tube 1 is preferably made of rubber, but could also be made of other materials suitable for the use of the perforated tube 1, such as other plastic/polymer materials. The tube 1 could be a hose or a pipeline. In general the term "tube" should be interpreted broadly throughout the application.

The perforated tube 1 is in a first end 1a adapted to be connected to one end of a supply tube 2 through a coupling 3. The connection between the diffusor and the supply of air could be performed in other ways without a connection and a supply tube. For instance, it is a possible embodiment of the invention that the perforated tube 1 and the supply tube 2 is made of one continuous tube divided into a perforated part 1 and a supply part 2 (not shown). In this embodiment, there is no connection between the parts. The perforated tube 1 will in the following also cover the meaning perforated part. Likewise, the supply tube 2 described, will also include an interpretation that the supply tube 2 could be a part of a tube.

The supply tube 2 is in the other end, facing away from the diffusor, connected to an arrangement for supplying of a gas, for instance a pressure tank of compressed air, a tank for liquid oxygen or a compressor for supply of oxygen or gas (not shown). The gas could for instance be oxygen or air.

In the embodiment shown in FIG. 1, there is arranged a short inner supply tube 4 and a long inner supply tube 5 at the inside of the perforated tube These inner supply tubes 4, 5 are extending from the supply tube 2 and the pressure tank to a suitable position in the perforated tube 1. The inner supply tubes are also referred to as a short inner supply tube 4 and a long inner supply tube 5. The inner supply tubes 4, 5 are located abreast to each other at the inside of the perforated tube 1. The inner supply tubes 4, 5 having respective outlets 4a, 5a (shown in FIG. 6) at the free ends of the inner supply tubes 4, 5 at the ends facing away from the supply tube 2. The inner supply 4, 5 tubes have different length, so that the gas is released into the perforated tube 1 at different locations form the outlets 4a, 5a. The free end of the short inner supply tube 4 is located closer to the coupling 3 and the supply tube 2 than the free end of the long inner supply tube 5.

Figure 2:
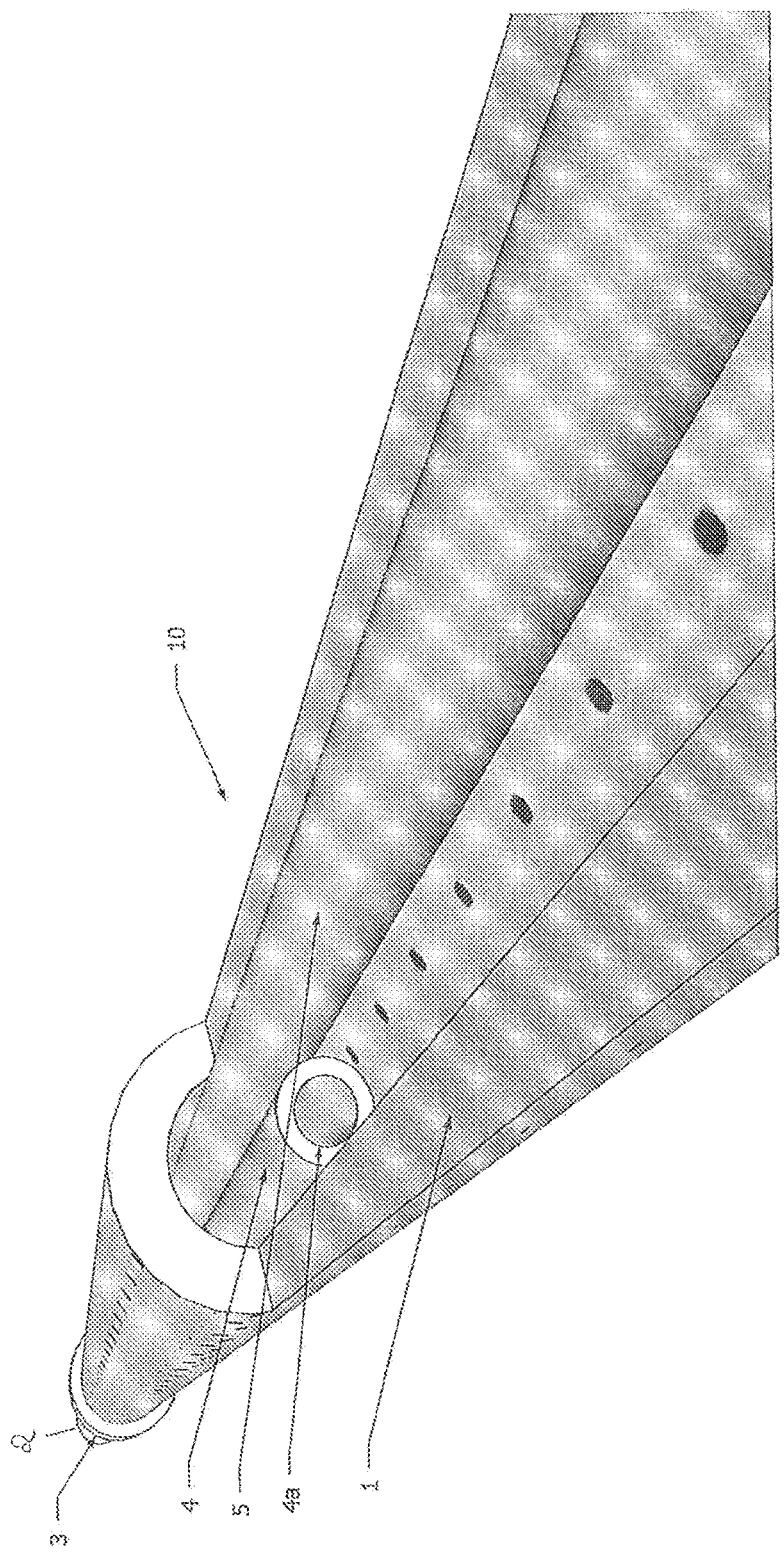
FIG. 2 shows a section view of the diffusor shown in FIG. 1.

FIG. 2 show s section view of the diffusor 10 shown in FIG. 1. In the figure, the outlet 4a of the short inner supply tube 4 is shown. The long inner supply tube 5 has resembling configuration but an outlet 5a at the free end of the inner supply tube 5 that is situated further away from the coupling 3 and the supply tube 2 than the short inner supply tube 4.

Figure 3:
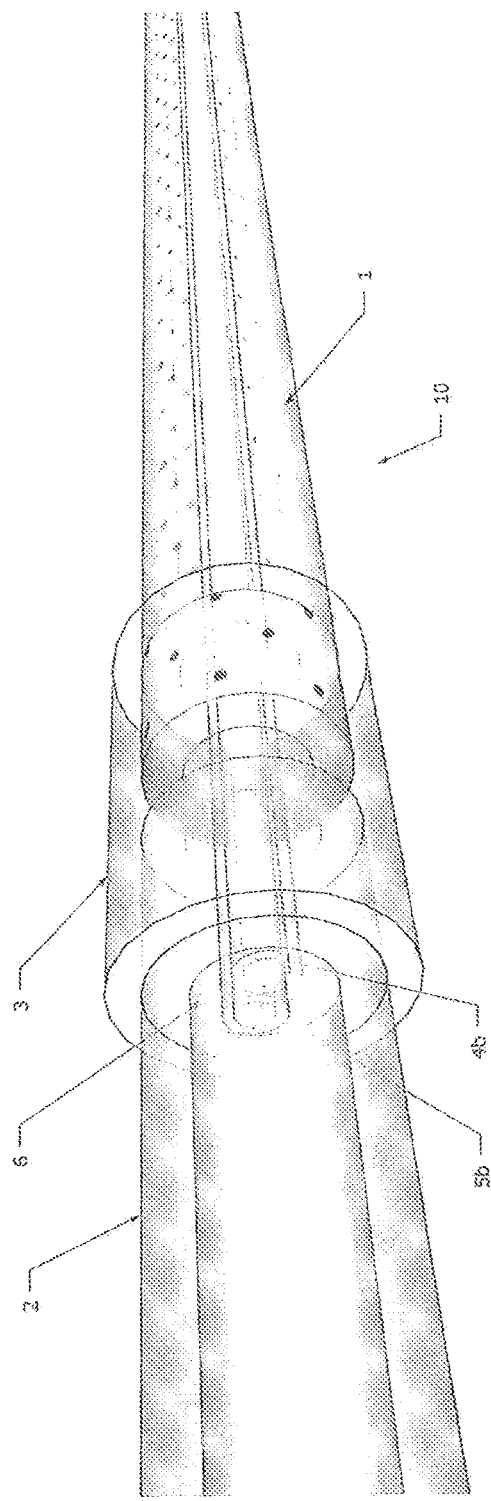
FIG. 3 shows a principle drawing of the connection between the supply tube and the diffusor tube with inner tubes.

FIG. 3 shows the embodiment of the invention where there is a coupling 3 between the supply tube 2 and the perforated tube 1. The coupling 3 is cylinder shaped and is connected to the ends of the supply tube 2 and the perforated tube 1. The coupling 3 is covering one end of the supply tube 2 and one end of the perforated tube 1 in order to connect the ends together. The supply tube 2 could be made of rubber or other materials suitable for the purpose of the tube 2. The coupling 3 in the figure is made of metal, but this is not limiting to the invention. Other couplings of other materials or other shapes could be used. The coupling 3 shown is only a possible embodiment of the invention.

The short inner supply tube 4 and the long inner supply tube 5 are extending from the supply tube 2 to the perforated tube 1 at the inside of the supply tube 2 and the perforated tube 1. There are arranged a first plug 6 in the end of the supply tube 2 facing the perforated tube 1. The first plug 6 having one or more openings, usually circular, adapted to enclose an inlet 4b, 5b arranged at the end of each of the inner supply tubes 4, 5. The inlets 4b, 5b are arranged at the opposite end than the outlets 4a, 5a of the inner supply tubes 4, 5. The first plug 6 is preferably made of rubber or metal, but other materials are possible. The first plug 6 could also be made of a material that is injected in the supply tube 2, for instance polymer material or a glue-like substance.

Figure 4:
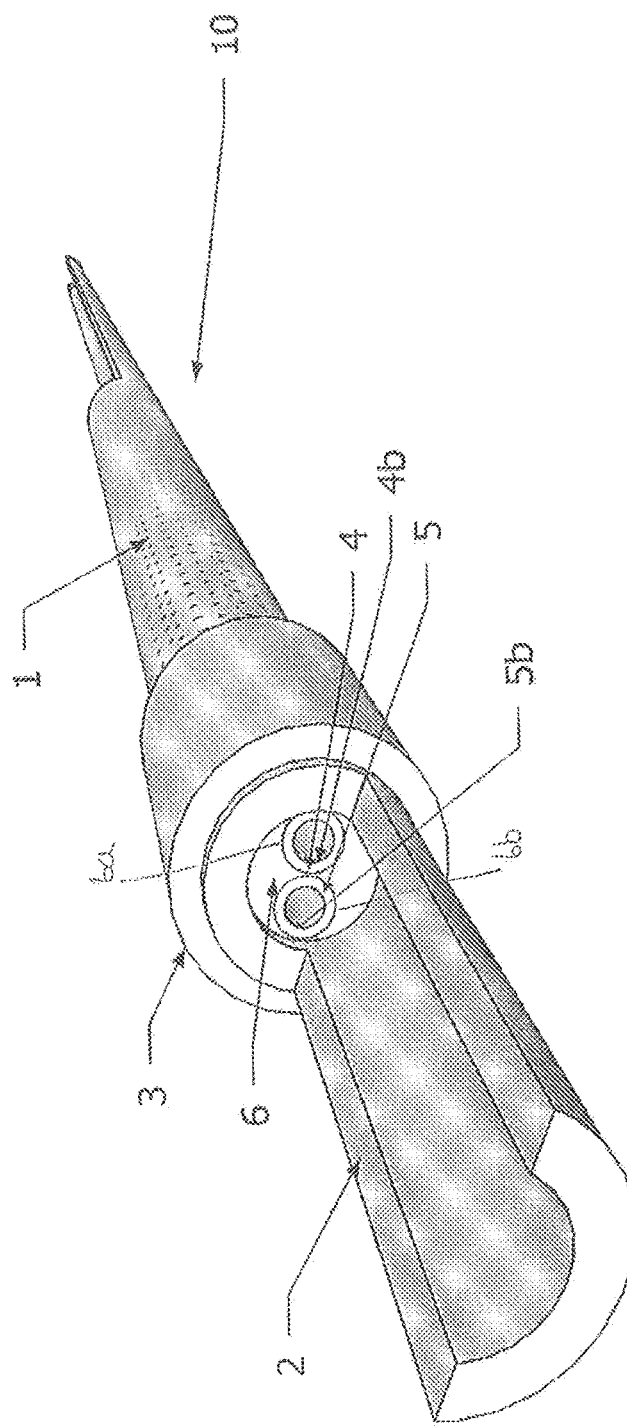
FIG. 4 shows the connection between the supply tube and the diffusor from FIG. 3, viewed from behind.

FIG. 4 shows the position of the first plug 6 in detail. The first plug 6 having a circular outer shape that adjoins the inner surface of the supply tube 2. The first plug 6 has openings 6a, 6b that accommodates the inlets of inner supply tubes 4b, 5b. The purpose of the first plug 6 is to create a first plug or seal between the supply tube 2 and the perforated tube 1 so that the gas is supplied only through the inner supply tubes 4, 5 or plug outlet 17 and prevents leakage or flow from the supply tube 2 to the perforated tube 1 other than through the inner supply tube 4, 5 or openings in the first plug made for the purpose as described later.

Figure 5:
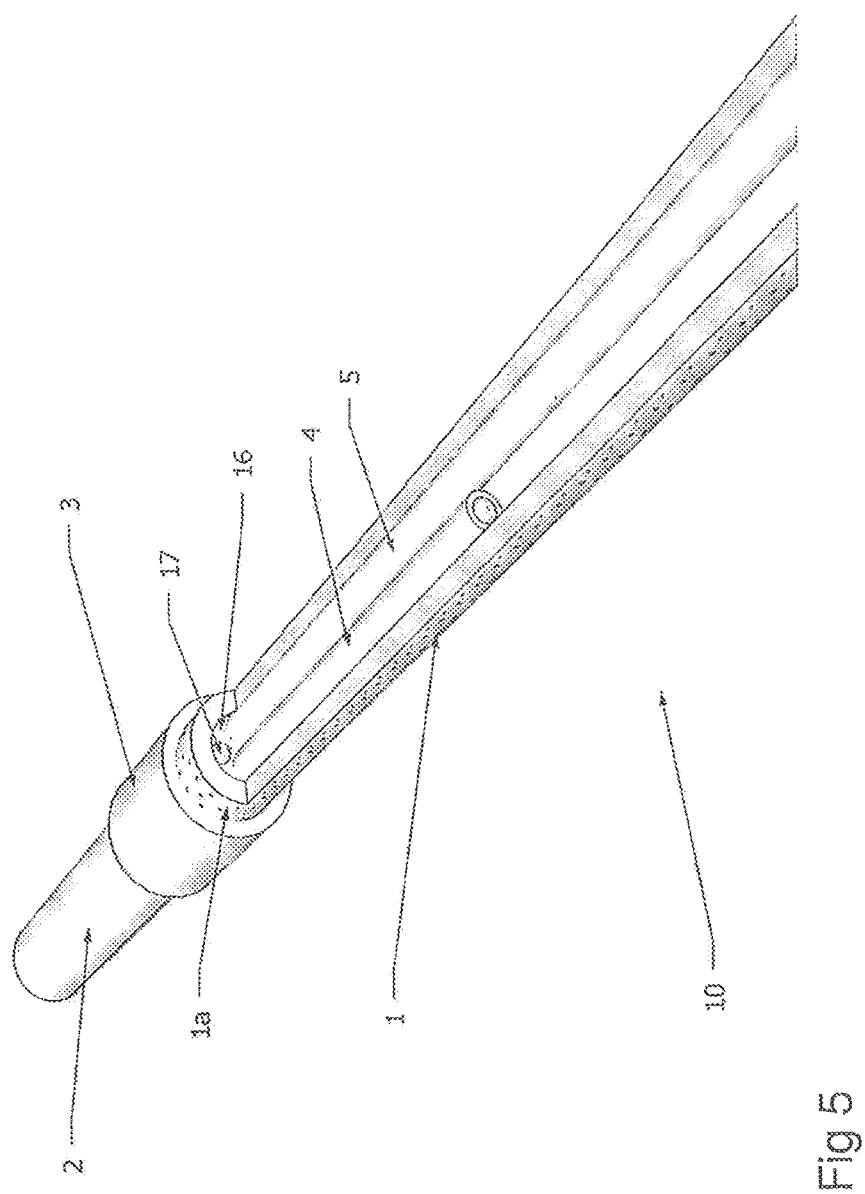
FIG. 5 shows a another embodiment of the invention with a coupling that has an additional opening between the supply tube and diffusor for adding gas or oxygen into the diffusor.

FIG. 5 shows another possible embodiment of the invention. In this figure there is arranged a first plug 16 with a different shape than the first plug described in FIG. 4. This plug 16 has an additional opening or outlet 17 situated next to the openings 6a, 6b for the inner supply tube 4, 5.

He opening 6a, 6b are adapted to receive the supply tubes at the inlet end 4,b, 5b of the inner supply tube 4, 5.

In this embodiment, gas, air or oxygen could be supplied into the diffusor from both the two inner tubes 4, 5 and the outlet 17 in the first plug 16. Thereby, the gas or oxygen is supplied to the perforated tube 1 at three different locations at the inside of the perforated tube 1. The material or other properties of the first plug 16 is similar as to the first plug described in FIG. 3.

Figure 6:
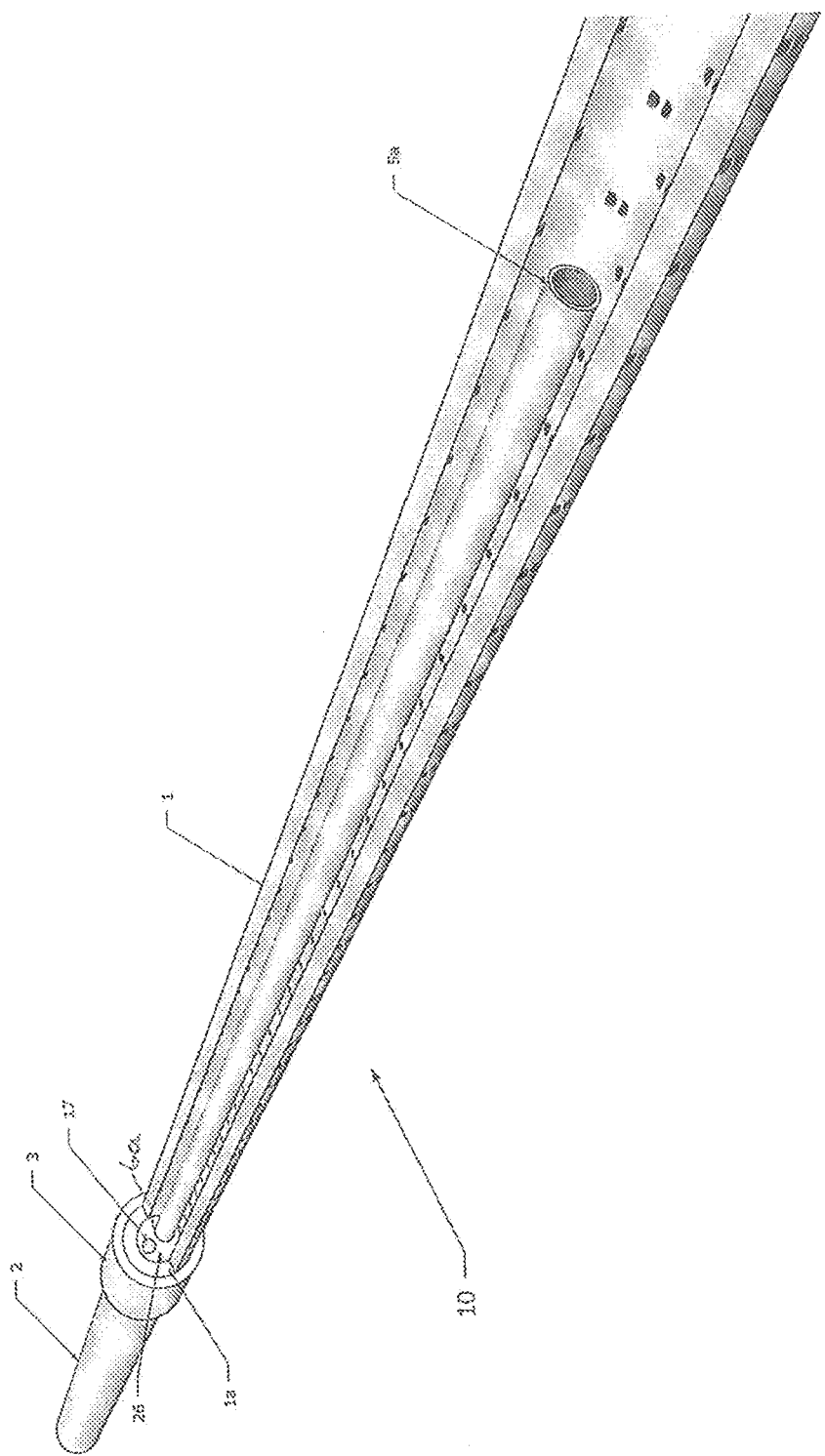
FIG. 6 shows another embodiment of the invention with only one inner tube and one opening in the coupling.
Figure 7:
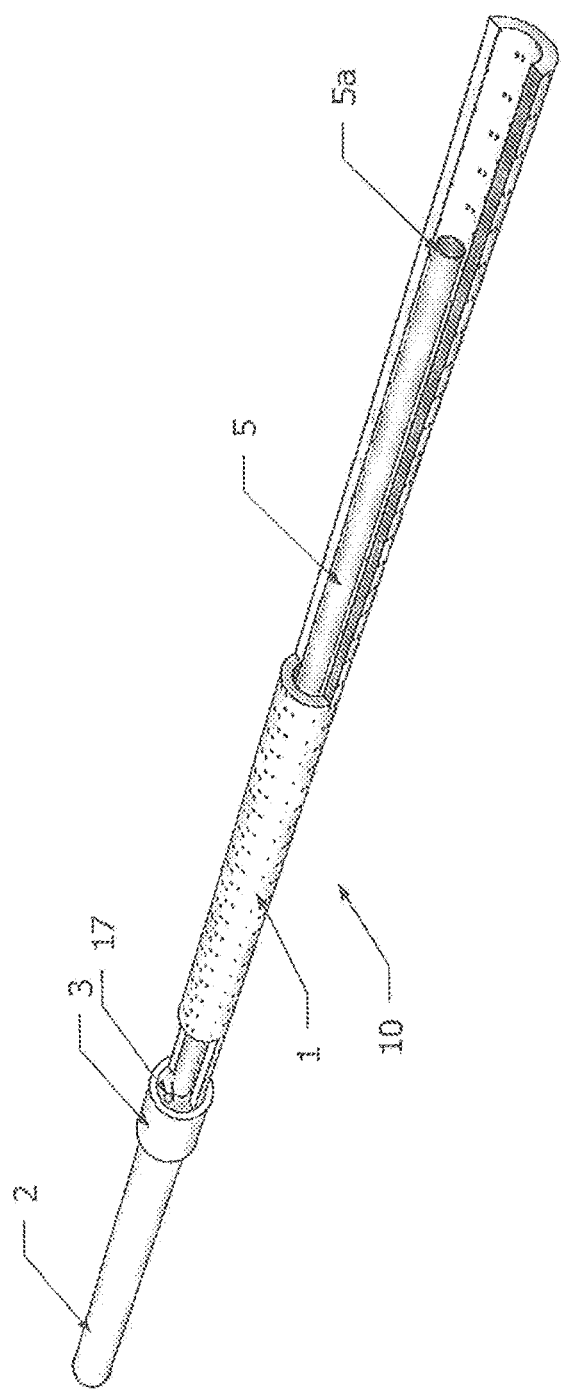
FIG. 7 shows a principle drawing of the embodiment of the invention shown in FIG. 6.
Figure 8:
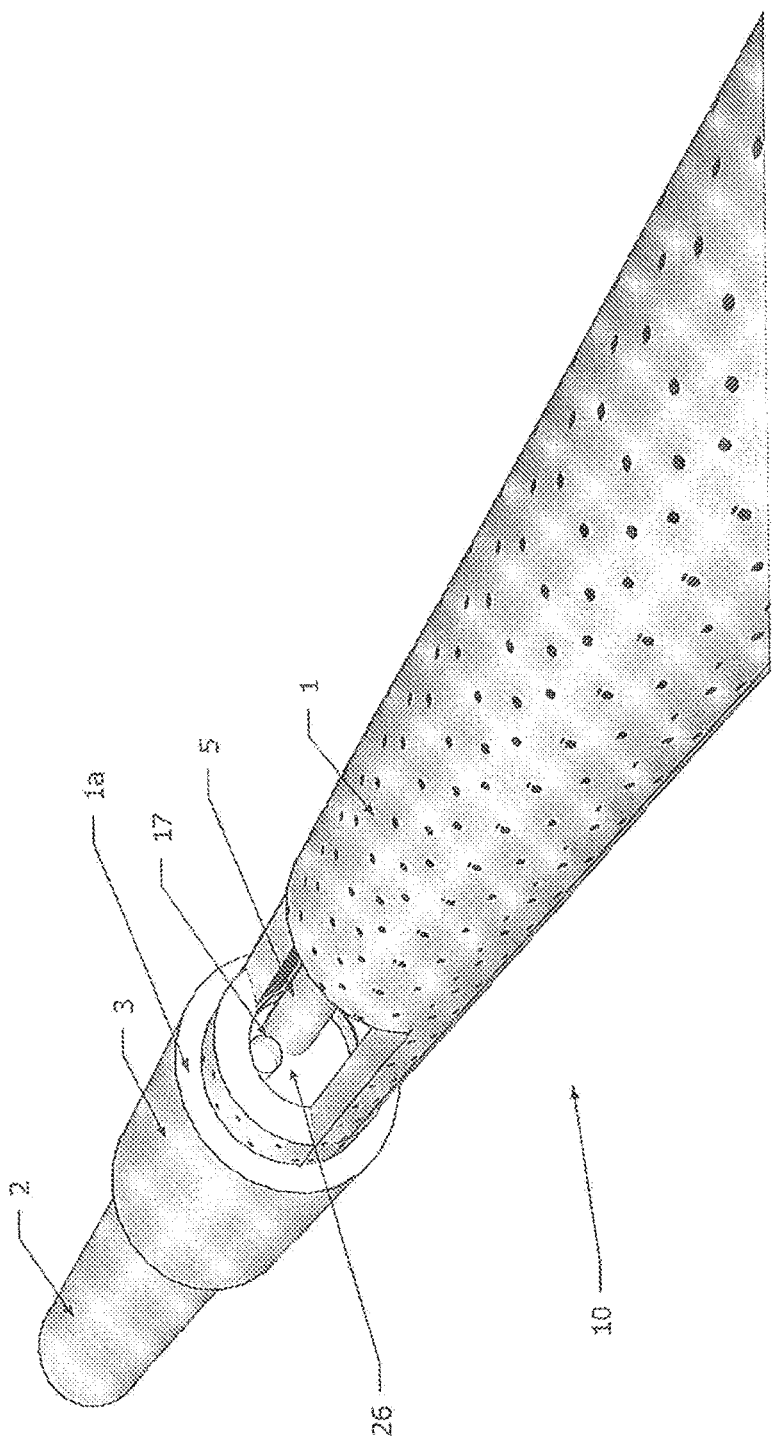
FIG. 8 shows a detailed view of the connection between the supply tube and the perforated rubber tube as shown in FIGS. 6 and 7.

FIG. 6 to FIG. 8 shows another embodiment of the invention where there is only one inner supply tube 5 in the perforated tube 1. A first plug 26 in this embodiment has only one opening 6a to receive the inner supply tube 5 and one outlet 17. The gas or oxygen could then be supplied into the diffusor 10 at two different locations inside the perforated tube 1: through the outlet 17 and the through inner supply tube 5 and out through the outlet 5a. FIGS. 7 and 8 illustrates that the inner supply tube 5 is situated at the inside of the perforated tube 1. The outlet 5a of the inner supply tube is arranged at a distance from the supply tube 2 ie a distance from the ends of the perforated tube 1.

The preferred embodiment in certain situations depends greatly on the length of diffusor 10 that is required where the diffusor is in use. The longer the diffusor is, the greater the number of locations for the supply of oxygen should be, ie a larger number of supply tubes 4, 5 or openings in the first plug 17 to supply gas or oxygen at different distances. There could also be different shapes and diameters of the perforated tube 1 or the inner supply tubes 4, 5, 15 which are essential for the number of inner supply tubes in the diffusor. The diameter and shapes of the perforated tube can be adapted to accommodate to the required number of inner tubes 4, 5, 15.

A large diameter of the perforated tube 1 will allow that there are more inner supply tubes 4, 5 arranged at the inside of the perforated tube 1 than if the diameter of the perforated tube 1 is small.

Likewise, if the inner supply tubes 4, 5, 15 having a small diameter, it is possible to arrange more inner supply tubes 4, 5, 15 in the perforated tube 1 than if the diameter of the inner supply tubes 4, 5, 15 are large.

Figure 9:
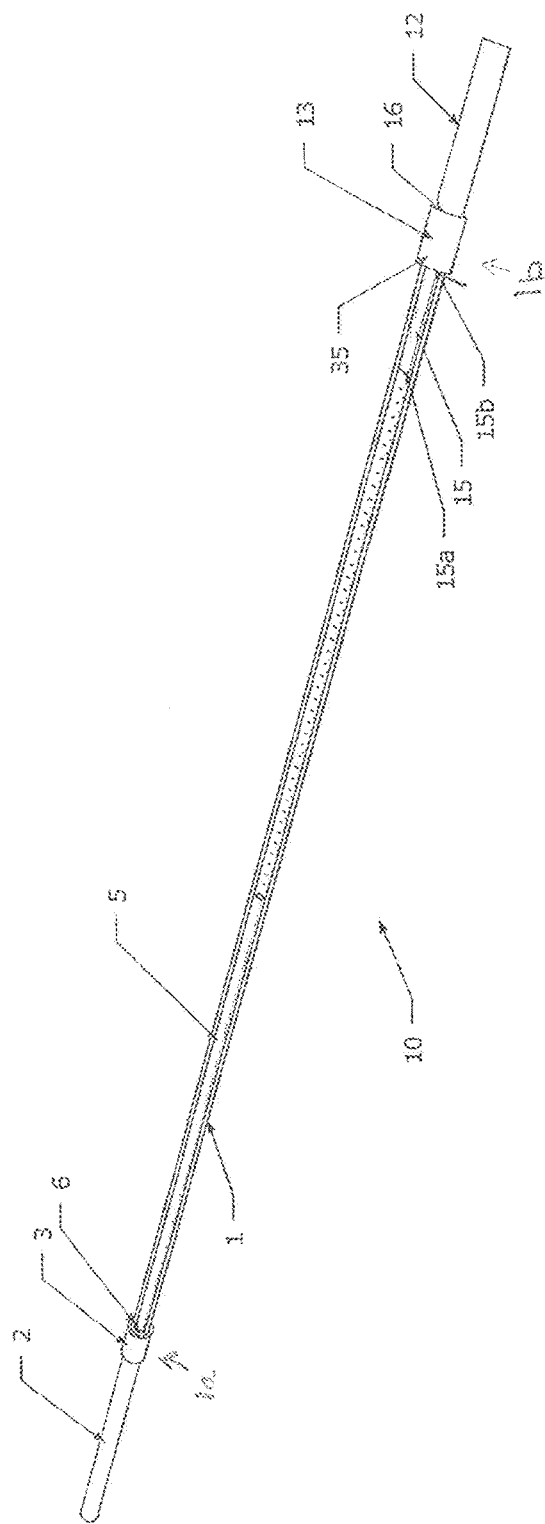
FIG. 9 shows a principle drawing of another embodiment of the invention where there are arranged supply tubes and inner tubes in both ends of the tube.

FIG. 9 shows yet another embodiment of the invention. The diffusor 10 in this embodiment could in an opposite second end 1b of the perforated tube 1, have a similar arrangement as described in any of the FIGS. 1 to 8 with one, two or three or more openings or outlets in the plug, hereinafter called a second plug (not shown).

In this opposite, second end 1b of the perforated tube 1, a corresponding arrangement with a second supply tube 12 connected to at least one inner supply tube 15 is arranged. The second supply tube 12 and the third inner supply tube 15 are connected together through a coupling 13 and a second plug with a suitable number of openings (not shown). The second plug is not shown in detail in the FIG. 9 but it could be arranged on the second end 1b of the perforated tube 1 and have similar shape as the first plugs 6, 16, 26 as shown in FIG. 4, 5, 6-8.

The third inner supply tube 15 has an outlet 15a and is connected to the second plug through an opening in the second plug as described earlier in relation to the first plug 6.

All of the different possible plugs described in FIG. 1-8 could be adopted at the second end 1b to form different embodiments of the diffusor 1. The varieties of the different plugs arrangement on the second end 1b could be combined with the variety of the different first plugs arrangements 6, 16, 26 on the first end 1a, a to create multiple combinations and embodiments of air or gas supplied in the diffusor. It is also possible to have more than two inner supply tubes 4, 5, 15 in both ends 1a and 1b of the perforated tube 1.

Figure 10:
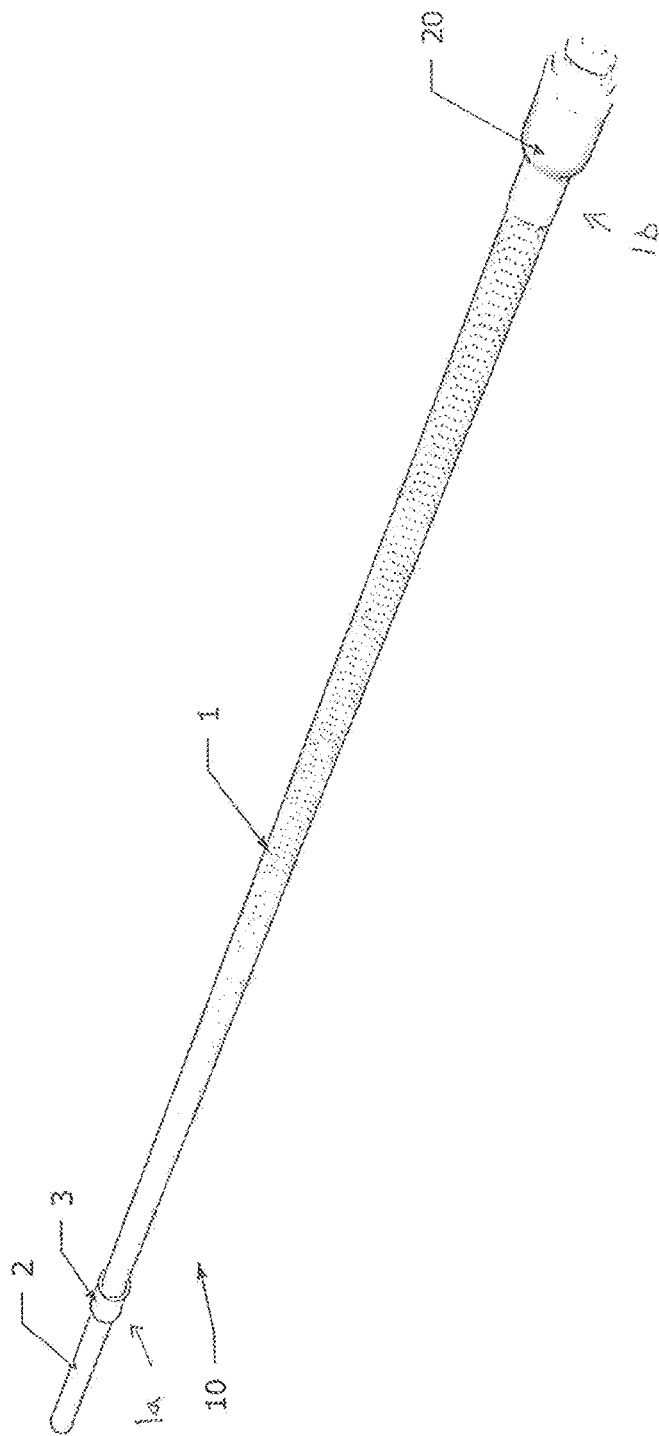
FIG. 10 shows a principle drawing of yet another possible embodiment of the invention with a pressure valve in the end of the diffusor.

FIG. 10 shows another possible embodiment of the present invention. In this embodiment, a pressure valve 20 is connected to the second end of the diffusor. This pressure valve 20 could be used in all configurations of the invention except for the principle shown in FIG. 9. The pressure valve 20 replaces the arrangement with the plug 36 and the third inner supply tube 15 in the second end 1b of the diffusor 10.

The function of the pressure valve 20 in FIG. 10 will now be described further. When the diffusor 10 is lowered into the water without gas supplied in the diffusor, the water will start to move into the perforated tube 1 which will be filled with water. It will take some time to empty the perforated tube 1 for water with use of gas pressure. Normal operation pressure is 1 to 6 bar. The pressure valve 20 will open at a pressure more than the normal operational pressure and the water will evacuate through the pressure valve 20 when the pressure is more than e.g. 10 bar. When the diffusor is empty of water, the pressure is reduced (manually) to normal operation pressure and the diffusor will work as normal.

This principle will work best with the first plug 16, 26 which have one plug outlet 17 and one or more inner supply tubes 4, 5 as shown in FIG. 5-8, The pressure drops a little when it is led through the inner supply tubes 4, 5 caused by friction etc in the inner supply tube 4, 5. The pressure at the outlet 4a, 5a will therefore be lower than at the plug outlet 17. Since the pressure at the plug outlet 17 is higher than by the inner supply outlets 4a, 5a, the water will be moved in the direction from the plug outlet 17 to the pressure valve 20 and out of the diffusor to the surrounding water through this pressure valve 20.

If the plug outlet 17 is missing, the portion of the water that is present in the diffusor 1 between the first plug 6 and the short inner supply outlet 4a will not be forced towards the pressure valve 20 and it will take longer time to remove the water from this part of the diffusor 10.

The pressurized gas forces the water out of the perforated tube 1 from the positions where the gas enters the diffusor 10. This means that the water is forced by the gas out of the diffusor 10 from the respective positions of the outlet 4a, 5a towards the pressure valve 20. The water in the perforated tube 1 situated between the first end 1a of the perforated tube 1 and the outlet 4a, 5a of the inner supply tube 4, 5 will use longer time to evacuate out of the perforated tube 1 than if there is no pressure valve 20.

The pressurized gas from the plug outlet 17 will evacuate the water from the first end of the perforated tube 1 towards the second end of the perforated tube 1b.

This principle could also be used to clean or disinfect the diffusor by use of gases or disinfectant.

In case of cleaning or disinfection of the diffusor 10, a disinfectant fluid is added to the diffusor 10 through the supply tube 2. The disinfectant fluid is further supplied through the outlets of the plug outlet 17 and/or the inner supply tube(s) 4, 5. Depending on the fluid and the cleaning process, the fluid could be left in the perforated tube 1 for a suitable amount of time to dissolve more effectively the pollutions in the diffusor.

A gas is supplied to the perforated tube 1 to evacuate or press the disinfectant fluid effectively out of the diffusor after the cleaning process is finished.

The oxygen, air or other gases from the supply tube 2 is supplied to the perforated tube 1 from the first plug outlet 17 in the first plug, openings in the second plug (not shown) or from outlets in the inner supply tubes 4a, 5a, 15a arranged at the inside of the perforated tube 1. The purpose of this is to achieve a distribution of oxygen by non-perforated tube or tubes at the inside of the diffusor. The diffusor could therefore be made of inner tubes 4, 5, 15 that are easy to manufacture and arrange inside the diffusor. It is also easy to distribute the gas through outlets that are arranged in optimum distances for the individual diffusors 1.

The diffusor 10 could also be provided with several weights and float regulators (not shown) so that the diffusor is held in a suitable depth in the tank or pond if the diffusor itself is not heavy enough to sink to the desired depth. This weight is attached in a traditional way to the diffusor and is not shown in any of the drawings. The diffusor 10 could also be provided with wire or a medium with a specific weight higher than water within the perforated tube 1 to increase the weight of the diffusor 10.

Figure 11:
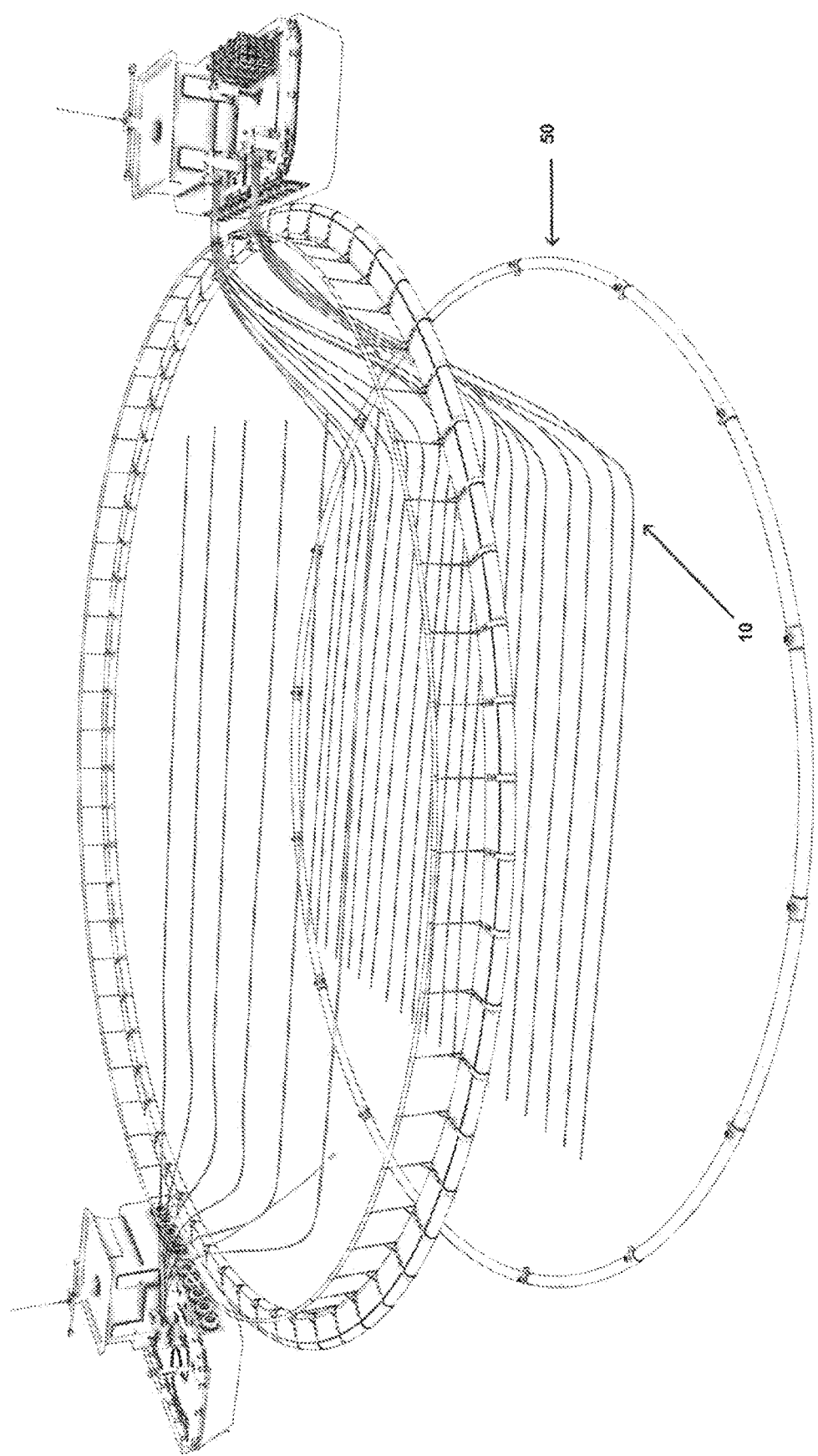
FIG. 11 is a principle drawing of a possible use of the invention. The figure shows a net cage or fish farm with several diffusors arranged in the net cage.

In FIG. 11 it is shown a principle drawing of a net cage which are used for the farming of fish. Several diffusors 10 are arranged parallel to each other in the net cage 50. This is illustrating an example of one possible use of the diffusor according to the invention. There are also other possible uses as described earlier.

FIG. 12 shows the diffusor arrangement from FIG. 11 in detail. The Figure shows several diffusors each having a perforated tube 1 coupled to a supply tube 2. The coupling 3 connects the perforated tube 1 and supply tube 2 together.

The diffusor is arranged in a suitable position in the net cage 50.

We have discussed the present invention in terms of the preferred embodiments with reference to the accompanying drawings. However, the present invention is by no means limited to the embodiments shown in FIG. 1-FIG. 12 and discussed above. The present invention covers various changes and modifications within the scope and spirit recited in the appended claims.

The invention claimed is:

1. A diffusor for adding of gases into water, the diffusor comprising a perforated tube and at least one supply tube, the at least one supply tube is in one end adapted to be coupled to a source for supplying gas and at the other end in fluid communication with the perforated tube, the gas is supplied to the perforated tube through at least one inner supply tube extending from the supply tube to the perforated tube, wherein at the least one inner supply tube is a non-perforating tube and has at least one outlet situated at a free end of the at least one inner supply tube, the gas is adapted to be distributed into the perforated tube through the at least one outlet, and wherein the at least one outlet of the at least one inner supply tube is situated in a range from one quarter to three quarter of the length of the perforated tube.

2. The diffusor according to claim 1, wherein the gas is supplied to the perforated tube through at least two outlets arranged within the perforated tube, the outlets are spaced apart from each other in such a way that the gas is distributed at the inside of the perforated tube.

3. The diffusor according to claim 2, wherein one of the at least two outlets is situated at a first end of the perforated tube.

4. The diffusor according to claim 1, wherein the at least one inner supply tube is enclosed respectively by at least one opening in a first plug, the first plug is arranged between the supply tube and the perforated tube, the first plug having at least one opening for the at least one inner supply tube.

5. The diffusor according to claim 4, wherein the one of the at least two outlets is arranged in the first plug for supplying gas directly at the first end of the diffusor.

6. The diffusor according to claim 1, wherein the diffusor having a first inner supply tube and a second inner supply tube, the first and second inner supply tubes extending at different positions within the perforated tube.

7. The diffusor according to claim 1, wherein the diffusor further comprises a second plug arranged between a second supply tube and the perforated tube at a second end of the perforated tube, the second plug having at least one opening for a third inner supply tube arranged at the second end of the perforated tube.

8. The diffusor according to claim 7, wherein the second plug having a least one additional outlet for supplying gas directly at a second end of the perforated tube.

9. The diffusor according to claim 7, wherein the diffusor further comprises two inner supply tubes, extending from the second plug, each of the two inner supply tubes having different length inside the perforated tube.

10. The diffusor according to claim 1, wherein the diffusor comprises a pressure valve at the opposite end of the perforated tube.

11. A method for evacuating water from, clean or disinfect a diffusor according to claim 1, the method comprising:
arranging a pressure relief valve at a second end of the perforated tube;
supplying a pressure gas or a disinfectant through the supply tube into at least one inner supply outlet situated on the free end of the at least one inner supply tube; and
displacing the water or contaminant out of the diffusor through the pressure relief valve, until a substantial portion of the water or contaminant is evacuated out of the diffusor.

12. The method for evacuating water from, clean or disinfect a diffusor according to claim 11, wherein the gas or disinfectant being supplied and distributed through at least two outlets arranged within the perforated tube the one of the at least two outlets is arranged substantially at a first end at the inlet of the diffusor.

13. The method for evacuating water from, clean or disinfect a diffusor according to claim 11, wherein the process for evacuating, cleaning or disinfecting the diffusor comprises:
supplying the disinfectant fluid to the diffusor; and
supplying a high pressure gas, the gas displacing the disinfectant fluid out of the diffusor through the pressure valve.

14. The method for evacuating water from, clean or disinfect a diffusor according to claim 13, wherein the disinfectant fluid is kept in the diffusor for a period of time before supplying the gas to displace the disinfectant.

\* \* \* \* \*